Jan. 11, 1966  J. B. HARDIN  3,228,619
CONTINUOUS FILM-HANDLING SYSTEM
Filed Aug. 29, 1963  2 Sheets-Sheet 1
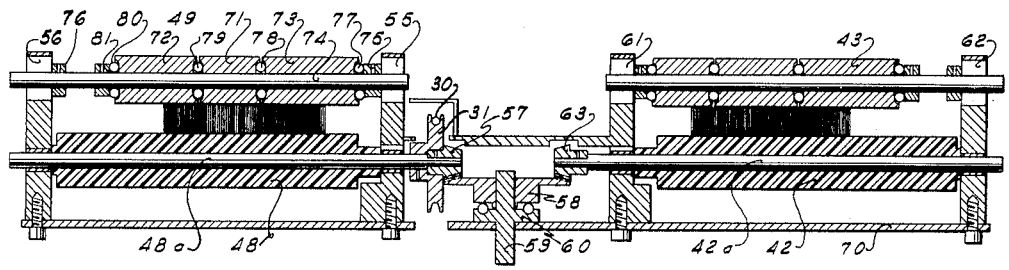
FIG. 3
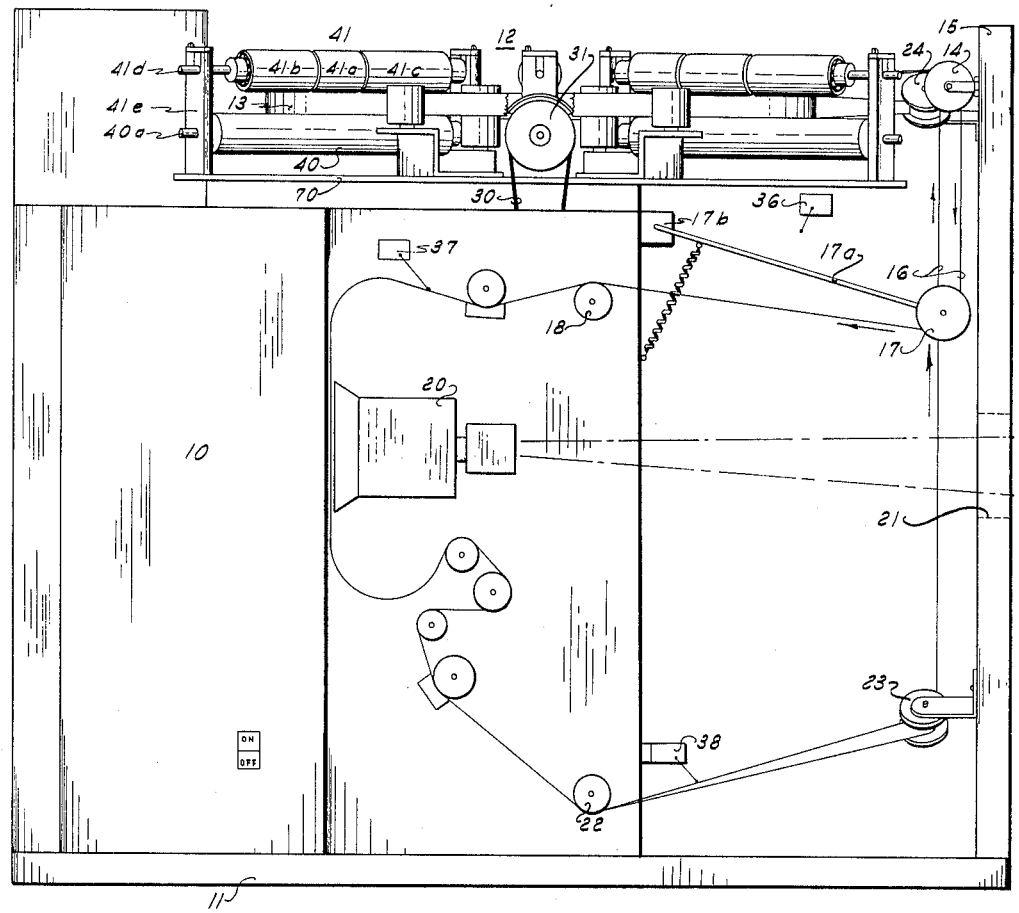
FIG. 1  JAMES B. HARDIN, INVENTOR.
BY Jan. 11, 1966     J. B. HARDIN     3,228,619
CONTINUOUS FILM-HANDLING SYSTEM
Filed Aug. 29, 1963     2 Sheets-Sheet 2

JAMES B. HARDIN, INVENTOR.

BY D. Gene Richards

United States Patent Office 3,228,619
Patented Jan. 11, 1966

1

3,228,619
CONTINUOUS FILM-HANDLING SYSTEM
James B. Hardin, 434 Arapaho Road, Richardson, Tex.
Filed Aug. 29, 1963, Ser. No. 305,783
5 Claims. (Cl. 242—55.19)

This application is a continuation-in-part of application Serial No. 129,804, filed August 7, 1961, and now abandoned.

This invention relates to a system for handling a film strip of the type employed in motion picture projection and the like but which is in continuous or loop form. More particularly, the invention relates to film guide and control means for feeding film onto the periphery of a spirally wound roll of film and for drawing film from the center thereof in a continuously operating system.

In systems of the prior art which are intended for continuous operation such as the showing repetitively of a long film strip without requiring an operator to be present, damage and breakage are commonly experienced by reason of improper film control. Prior art devices have been provided for continuous film operation but time limits of the order of a few days continuous running have been about the maximum that has been attained. In such systems it has been found that the operation may be wholly satisfactory for periods of hours only and ultimately the process of feeding the film onto the periphery of a spirally wound roll and extracting the film from the center portion of the roll has resulted in tensile forces being built into the film roll so that operation must be stopped and adjustments made or else the film will break. It is an object of the present invention, therefore, to overcome the inherent limitations of such prior art systems and more particularly to provide a film-handling apparatus which will permit practically unlimited continuous operation. Thus, the system of the present invention is designed for utilization in connection with motion picture film strips, magnetic tapes and the like where a closed loop continuous film feed is necessary.

It is a further object of the invention to provide a film-handling system which provides for continuous mechanical working axially of a roll of film at a plurality of radially spaced points by rollers which are confined generally radially but which are locally deformable to follow variations in the surface profile of the film roll.

More particularly, in accordance with the present invention there is provided a reel for a continuous spirally wound film or tape roll wherein the film is fed to the periphery of the roll and is withdrawn from the roll at its center. The system includes a plurality of pairs of cylindrical rollers extending horizontally and substantially radially from a central axis. Each of the pairs of rollers includes a drive roller of unitary construction for support of a film roll and an aligning roller positioned parallel to and vertically above the drive roller. The aligning roller is mounted for free movement toward and away from the fixed drive roller and is segmented along the length thereof for local deformation depending upon the configuration of the upper surface of the film roll. A means is then provided for rotating the drive rollers at a peripheral speed corresponding with the speed of the film as it is drawn from the center of the film roll.

In accordance with a further aspect of the invention, there is provide a combination of a film utilization device having a primary drive for feeding film thereto at a predetermined constant rate. There is provided a film reel mounted as to support a spirally wound roll of film with the axis of said roll substantially vertical. The reel includes a plurality of horizontally disposed, radially extending pair of rollers. Each of the pairs of rollers includes a fixed driven cylindrical roller extending radially from the axis of said film roll and driven in synchronism with said

2 utilization device at a peripheral speed corresponding with the speed at which the film is fed to said utilization device. Each of said pairs of rollers further includes a segmented follower roller spaced vertically above the drive roller and freely rotatable in contact with the upper surface of the film roll and locally deformable to follow major variations in the upper profile of the film roll. Guide means are then provided for feeding the film from the center layer of the roll to the utilization device and from said utilization device to the outer peripheral layer of the film roll.

For a more complete understanding of the present invention and for further objects and advantages thereof, reference may now be had to the following description taken in conjunction with the accompanying drawings in which:

FIG. 1 is an elevation view of a motion picture projector and reel, with the reel shown partially in section as along line 1—1 of FIG. 2;

FIG. 3 is a sectional view taken along lines 3—3 of FIG. 2; and

Figure 2:
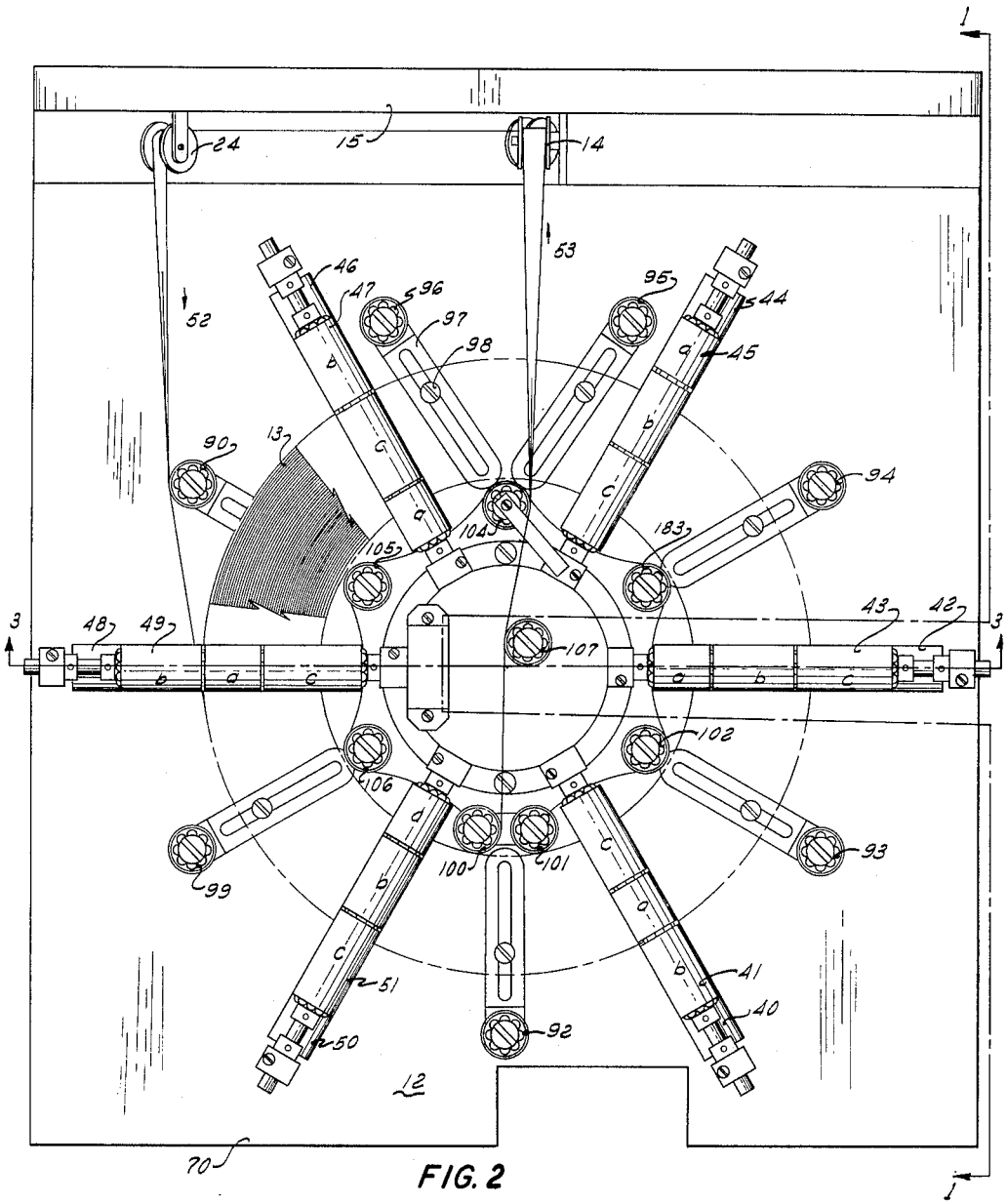
FIG. 2 is a top view of the reel of FIG. 1.

Referring now to FIG. 1, there is illustrated a motion picture projector 10 which is mounted on a base 11. Supported on top of the projector 10 is a reel system 12 which supports a spirally wound photographic film roll 13. The axis of the roll 13 is substantially vertical so that the roll is horizontal as it lies above the projector 10. Film is fed from the center of the roll 13 over a pulley 14 which is mounted on a front panel 15. The film strip 16 is then threaded downwardly over a second pulley 17 and thence over the guide pulley 18 from whence it travels through a prescribed normal course in the projector 10. In so doing, it passes the lens system 20 so that the impressions on the film 16 are projected through an aperture 21 in the front plate 15 and onto a suitable screen.

The film 16 leaves the projector 10, passing over the lower pulley 22 and thence over a canted pulley 23 which is mounted on the front panel 15. From pulley 23 the film strip 16 passes upwardly over a second canted pulley 24. From pulley 24 the film is fed onto the periphery of the roll of film 13.

The reel 12 in combination with the projector 10, in accordance with the present invention, permits the continuous operation of the projector 10. The roll of film 13 is an endless roll so that the film is continuously fed from the center of the roll over pulley 14 and thence to projector 10 and is continuously fed from projector 10 back to the roll 13 over the pulley 24.

The film fed to a projector ordinarily is supplied from a supply reel and is fed to a take-up reel, both of which are driven by a belt drive or other linkage extending from the projector. By this means the feed is synchronized with the operation of the projector 10. In the present case a reel drive is utilized for film control. More particularly, a belt 30 passes upwardly through the center of base plate 70 of the reel 12. The belt 30 then passes over a pulley 31 (shown in the broken away section). The pulley 31 thus serves to drive a plurality of horizontally disposed rollers such as the roller 40. The system is so proportioned that the roller 40 is driven from projector 10 with a peripheral speed which is substantially equal to the speed that the film 16 is utilized in projector 10.

It will be noted that the pulley 17 is supported by an arm 17a from a hinge device 17b mounted on the projector 10. As shown only in FIG. 1, a plurality of safety switches 36, 37 and 38 are mounted at various points along the path of a film 16 so that if for any reason the film does not bear the proper tension, the projector will be automatically shut off. The electrical circuits extending from the switches have not been illustrated since they are well-known to those skilled in the art. However, it will be noted that the switch 36 is adapted to be actuated by the arm 17a when and if the arm 17a is raised upwardly as by an increase in tension in the film between the pulleys 14 and 18. The switches 37 and 38 include feeler arms which ride on the film. In response to a condition of slack film, they de-energize the projector 10. The foregoing safety devices in practice have been found to be called into play so infrequently as to perhaps justify their elimination. However, they have been included herein for the sake of completeness.

It will be recognized that a substantial problem exists in being able to utilize long films whether they be photographic film, magnetic tape or other film in a continuous feed system without placing stress on the film greater than its ultimate strength. The spool of film must continuously adjust itself since, as best shown in FIG. 2, the film is fed onto the roll 13 at the periphery thereof. As the roll is driven to receive more film, a particular segment will progressively move toward the center of the roll thus requiring substantially continuous movement of each segment relative to any segment in any adjacent layer. This must be accomplished without increasing the tension and preferably while maintaining the roll as a flat disk. Thus the alignment of the various layers becomes a significant accomplishment.

Figure 4:
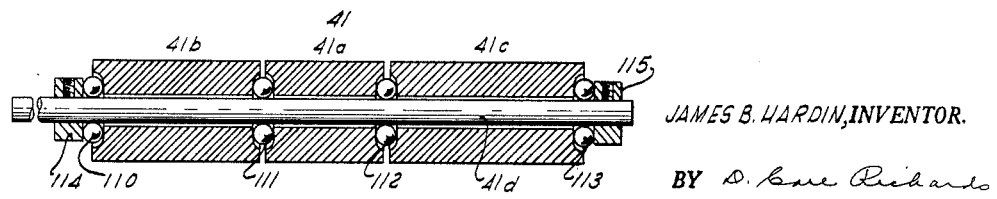
FIG. 4 is a sectional view of a follower roller.

In the present invention aligning rollers such as the roller 41 are employed to assist in maintaining control of the shape of the roll 13. Roller 41 is segmented and, as illustrated in FIGS. 1 and 4, includes three sections 41a, 41b and 41c. The sections 41a, 41b and 41c are of different and progressively increasing length. As will hereinafter be shown, the sections 41a, 41b and 41c also have an inner bore which is larger than the diameter of the shaft 41d on which they are mounted and thus they are locally deformable along the length of the roller 41 to conform more generally with the profile of the upper surface of the roll 13. It will be noted that the shaft 41d is mounted in a slot in the upper end of the support member 41e so that the roller 41 may move freely toward and away from the lower roller 40. In contrast, the lower roller 40 is mounted on a shaft 40a which is maintained in fixed position in the support 41e. The opposite ends of the shaft 41d and 40a similarly are mounted.

As best seen in FIG. 2, a plurality of pairs of rollers such as the rollers 40 and 41 are employed for support and control of the roll of film 13. More particularly, the film is fed onto the roll 13 at the left hand side as viewed in FIG. 2 onto the outer periphery thereof as indicated by the arrow 52. As the roll 13 rotates in a counter-clockwise direction, the film is extracted from the center thereof, traveling in the direction of the arrow 53. Positioned in clockwise succession with reference to the rollers 40 and 41 are the rollers 42 and 43, 44 and 45, 46 and 47, 48 and 49, and 50 and 51. It will be noted that the rollers 40–51 extend radially with respect to the film roll 13 and, as seen in FIG. 1, they are substantially horizontal. The roller 40 is generally parallel to roller 41. The rollers 40, 42, 44, 46, 48 and 50 are co-planar and are all driven at the same speed such that the peripheral velocity thereof is equal to the velocity of the film as it leaves the reel and is utilized in the projector 10.

Referring now to FIG. 3, it will be seen that the roller 48 is journaled in supports 55 and 56. The pulley 31 is mounted at the right hand end of the shaft 48a and is fixed to the shaft so that the belt 30 will drive the roller 48. The shaft 48a also carries a bevel gear 57 which meshes with a similar gear 58. The gear 58 is an idler gear and is mounted on a shaft 59 and is supported on a bearing 60. The gear 58 is free to rotate relative to shaft 59.

The roller 42 which is diametrically opposite the roller 48 is mounted on a shaft 42a which is journaled in bearings in the supports 61 and 62. Shaft 42a supports a bevel gear 63 at the left end thereof. The bevel gear 63 meshes with the gear 58 so that the gear 58 transfers the driving power from the shaft 48a to the remaining ones of the lower rollers 40, 42, 44, 46 and 50. The lower rollers are unitary in construction and, as shown in FIG. 3, are of a plastic material which is able to withstand the mechanical working by the edges of the film, Teflon having been found to be suitable. It will be noted that the supports 55, 56, 61 and 62 are mounted on a base plate 70 which in turn is supported on the upper surface of the projector 10 of FIG. 1. In a preferred embodiment of the invention, the lower driving rollers are each formed by mounting a tube of Teflon on a shaft. The Teflon tube is keyed or pinned to the shaft so that, as the shaft is driven by the idler gear 58, the Teflon sleeve will be caused to rotate therewith, thus applying a driving force to the lower surface of roll 13.

In contrast, the upper rollers 41, 43, 45, 47, 49 and 51 are made of metal, preferably steel, and are mounted as follower rollers riding on the upper surface of the film roll 13. For example, the upper roller 49, FIG. 3, is comprised of three short roller members 71, 72 and 73. The shaft 74 is mounted in slots in the supports 55 and 56. Shaft 74 is maintained in fixed axial position by the rings 75 and 76. The rollers 71, 72 and 73 are of differing lengths. The central roller 71 is relatively short. The outer roller 72 is of intermediate length, and the center roller 73 is longer than either of the other rollers. The rollers 71–73 have enlarged diameters so that they fit loosely on the shaft 74. The ends of the rollers are cup-shaped to receive ball bearings such as the bearings 77, 78, 79 and 80. They are maintained in position axially by the ring 81. By segmenting the upper roller and providing it with an enlarged diameter with ball bearings between the ends thereof, the roller elements 71–73 may travel at different peripheral speeds as they follow the upper surface of the film roll 13. They may also be subject to local deformation to follow the major contours of the upper surface of the film roll. Thus, they become self-adjustable followers and by this means provide guiding and controlling forces on the upper surface of the film roll to maintain it substantially planar in spite of the varying tensile forces and movement of the segments of the film as it is placed in operation.

In addition to the guiding forces placed on the film roll 13 by the lower driving rollers and the upper idler rollers, there are also provided some guiding forces by means of a plurality of rollers whose axes are perpendicular to the guide and drive rollers above discussed. More particularly as shown in FIG. 2, a ring of outer guide rollers, such as the rollers 90, 91, 92, 93, 94, 95 and 96, are provided. They are mounted on adjustable brackets, such as the bracket 97 which is secured to the base plate 70 by a screw 98. The brackets serve to maintain the film roll 13 substantially centered relative to the reel 12. Adjustments in the positions of the brackets permit use with film strips of varying length.

In addition to the outer ring of rollers, a plurality of vertical inner rollers are also provided. More particularly, the film is fed from the reel over the first inner roller 100. A companion roller 101 is provided adjacent to the extraction point. Additional rollers 102–106 are provided at uniformly spaced points around the inner perimeter of the film roll 13. In addition, a central roller 107 is provided at a point near the central axis of the reel 12 to provide guidance for the film between rollers 100 and 104 as it is extracted from the film roll 13. The rollers 90–96 and 100–101 are mounted in a manner on ball bearings similar to the mounting of the drive and follower rolls. However, they are all idler rollers so that they move only in response to contact with an inner or outer surface of the film roll 13 or the film as it moves onto or is extracted from the film roll 13.

It is again noted that the idler rollers 41, 43, 45, 47, 49 and 51 are segmented, each roller being formed from three separate roller elements. In FIG. 4 three roller elements, the elements 41a, 41b and 41c, have been shown as mounted on the shaft 41d. It will be noted that the shaft 41d is of smaller diameter than the passage through the rollers 41a, 41b and 41c. The bearings 110, 111, 112 and 113 support the rollers in an approximately axially aligned position on the shaft 41d. More particularly, a ring 114 is fixed onto the left end of the shaft 41d and opposes the thrust of the bearings 110 by axial movements of the roller 41d. Similarly, the bearing 111 opposes the forces present between the rollers 41a and 41b. The bearing 112 opposes forces between the rollers 41a and 41c. The ring 115 opposes the forces on the ring 41c. Since the diameter of the hole through the rollers 41a–41c is larger than the diameter of shaft 41d, there may be local deformations along the length of the roller 41 to conform with the surface of the film roll. The ends of the rollers are concave inwardly so that they form an annular cavity in which the bearings 110–113 are positioned. The axial length of the concave surface is slightly less than one-half the diameter of the bearings. The depth of the cavity is greater than the diameter of the bearings so that some lateral movement is permissible.

Further, the orientation of the various roller elements of different lengths in each of the rollers 41, 43, 45, 47, 49 and 51 is such that the roller elements on adjacent rollers are staggered.

In one embodiment of the roller elements of lengths a, b and c were distributed as illustrated in FIG. 3 and were found to be satisfactory where the following dimensions, given by way of example and not by way of limitation, were employed:

The rollers 40, 42, 44, 46, 48 and 50 were 0.75 inch diameter and 4.5 inches long; and The elements a, b, and c were 0.75 inch in diameter and 0.875 inch, 1.25 inches and 1.5 inches long, respectively.

Having described the invention in connection with certain specific embodiments thereof, it is to be understood that further modifications may now suggest themselves to those skilled in the art and it is intended to cover such modifications as fall within the scope of the appended claims.

What is claimed is:

1. In a reel for a continuous loop spirally wound film roll wherein film is fed onto the periphery and is withdrawn from the center thereof, the combination which comprises a plurality of pairs of cylindrical rollers extending horizontally and substantially radially from a central axis, each of said pairs of rollers including a drive roller of unitary construction for support of said film roll and a follower roller positioned parallel to and vertically above said drive roller, each said follower roller being segmented and mounted for free translational movement of each segment relative to the other toward and away from a drive roller for control of the configuration of the upper surface of said film roll, and a drive linkage interconnecting all of the drive rollers for synchronizing rotation thereof.

2. In a reel for a continuous loop spirally wound film roll wherein film is fed onto the periphery and is withdrawn from the center thereof, the combination which comprises a plurality of pairs of cylindrical rollers extending horizontally and substantially radially from a central axis, each of said pairs of rollers including a drive roller of unitary construction for support of said film roll and an aligning roller positioned parallel to and vertically above said drive roller, each said aligning roller being segmented and mounted for free translational movement of each segment relative to the other toward and away from a drive roller for control of the configuration of the upper surface of said film roll, and means for rotating the drive rollers at a peripheral speed of the order of the speed of said film as withdrawn from the center of said roll.

3. In a reel for a continuous loop spirally wound film roll wherein film is fed onto the periphery and is withdrawn from the center thereof, the combination which comprises a plurality of pairs of cylindrical rollers extending horizontally and substantially radially from a central axis, each of said pairs of rollers including a drive roller of unitary construction for support of said film roll and an aligning roller positioned parallel to and vertically above said drive roller, a shaft for each said aligning roller being journaled for free translational movement toward and away from a drive roller, each aligning roller being segmented and having a center bore exceeding the diameter of its shaft to permit each segment to move independently of every other segment toward and away from its drive roller for radially zoned control of the configuration of the upper surface of said film roll, peripheral and center guide means to maintain said roll between said pairs of rollers, and means for rotating the drive rollers at a peripheral speed of the order of the speed of said film as withdrawn from the center of said roll.

4. The combination in claim 3 in which each follower roller comprises long and short segments and wherein the long and short segments differ in radial sequence as between at least two of said follower rollers.

5. A system for operating a continuous loop spirally wound film roll which comprises a reel unit including a plurality of pairs of cylindrical rollers extending horizontally and substantially radially from a central axis, a film utilization device supporting said reel unit with a driving roller of each pair in a fixed position and located beneath a follower roller which is freely movable toward and away from the drive roller, the drive rollers being adapted to support said film roll, a shaft for each follower roller mounted for translational movement toward and away from the drive rollers, a segmented follower roller on each said shaft having center bores larger than the diameter of said shaft for translational movement of each segment relative to every other segment separately to follow and control the upper surface configuration of said roll at radially spaced zones, said film utilization device including a film drive for moving film therethrough at a predetermined speed, means for driving said drive rollers in synchronism with a peripheral speed of the order of said predetermined speed, guide means for directing film from said film roll at the center thereof to the utilization device, and guide means for directing film from said utilization device onto the outer perimeter of said film roll.

References Cited by the Examiner

UNITED STATES PATENTS

| 994,042 | 5/1911 | Uebelmesser | 242—55.19 |
| 2,281,328 | 4/1942 | Shapiro | 242—55.19 |
| 2,363,403 | 11/1944 | De Napoli | 242—55.19 |
| 2,436,032 | 2/1948 | Bendfelt | 242—55.19 X |

FOREIGN PATENTS

| 622,827 | 12/1935 | Germany. |
| 496,974 | 12/1938 | Great Britain. |
| 665,211 | 1/1952 | Great Britain. |

MERVIN STEIN, *Primary Examiner.*